US009540971B2

(12) United States Patent
Bauck et al.

(10) Patent No.: US 9,540,971 B2
(45) Date of Patent: Jan. 10, 2017

(54) METHOD TO PREVENT DEBRIS BUILD-UP ON RECIPROCATING AIR MOTOR PILOT VALVES

(75) Inventors: Mark L. Bauck, Coon Rapids, MN (US); Zaixing You, Suzhou Jiangsu (CN); Xueshui Wu, Jiangsu (CN); Jin Tian, Jiangsu (CN)

(73) Assignee: Graco Minnesota, Inc., Minneapolis, MN (US)

( * ) Notice: Subject to any disclaimer, the term of this patent is extended or adjusted under 35 U.S.C. 154(b) by 477 days.

(21) Appl. No.: 14/112,677

(22) PCT Filed: Apr. 25, 2012

(86) PCT No.: PCT/US2012/034987
§ 371 (c)(1),
(2), (4) Date: Oct. 18, 2013

(87) PCT Pub. No.: WO2012/149013
PCT Pub. Date: Nov. 1, 2012

(65) Prior Publication Data
US 2014/0033910 A1    Feb. 6, 2014

Related U.S. Application Data

(60) Provisional application No. 61/479,483, filed on Apr. 27, 2011.

(51) Int. Cl.
*F04B 9/133*    (2006.01)
*F01L 25/06*    (2006.01)
(Continued)

(52) U.S. Cl.
CPC ................ *F01L 25/063* (2013.01); *F04B 9/12* (2013.01); *F04B 53/10* (2013.01); *F16N 13/16* (2013.01); *F01L 23/00* (2013.01); *F04B 9/133* (2013.01)

(58) Field of Classification Search
CPC .......... F01L 23/00; F01L 25/063; F04B 9/125; F04B 9/133; F01B 17/00
(Continued)

(56) References Cited

U.S. PATENT DOCUMENTS 3,094,938 A    6/1963   Blomeke et al.
3,282,167 A *  11/1966  McKenzie ............ F01L 25/063
                                                    417/397
(Continued)

FOREIGN PATENT DOCUMENTS

CN    101668948 A    3/2010
CN    101825217 A    9/2010
(Continued)

OTHER PUBLICATIONS

The Office Action mailed Nov. 11, 2015 for Taiwan Pat. Appln. No. 101115251.
(Continued)

*Primary Examiner* — Michael Leslie
*Assistant Examiner* — Michael Quandt
(74) *Attorney, Agent, or Firm* — Kinney & Lange, P.A.

(57) ABSTRACT

An end cap assembly for a reciprocating air motor comprises a pilot valve and an end cap body. The pilot has a valve stem. The end cap body comprises a central bore for receiving an air motor rod, a valve bore in which the pilot valve is disposed such that the valve stem extends through the end cap body, and an air port extending through the end cap body. The air port has a contour to direct air toward the valve stem.

18 Claims, 6 Drawing Sheets

(51) Int. Cl.
*F16N 13/16* (2006.01)
*F04B 9/12* (2006.01)
*F04B 53/10* (2006.01)
*F01L 23/00* (2006.01)

(58) Field of Classification Search
USPC .......................................................... 91/313
See application file for complete search history.

(56) References Cited

U.S. PATENT DOCUMENTS

| | | | | |
|---|---|---|---|---|
| 3,405,606 | A | * | 10/1968 | Scheffer ................ F01L 25/063 91/306 |
| 3,563,273 | A | * | 2/1971 | Mills ....................... F15B 13/04 137/625.69 |
| 3,943,823 | A | | 3/1976 | Tammy |
| 4,846,045 | A | | 7/1989 | Grach et al. |
| 4,917,580 | A | | 4/1990 | Schnetzer |
| 5,188,518 | A | | 2/1993 | Saita |
| 5,366,353 | A | * | 11/1994 | Hand ..................... F01L 25/063 137/625.69 |
| 5,527,160 | A | | 6/1996 | Kozumplik, Jr. et al. |
| 7,587,897 | B2 | | 9/2009 | Strong |
| 7,603,855 | B2 | | 10/2009 | Strong |
| 2008/0240944 | A1 | | 10/2008 | Arens |
| 2012/0060941 | A1 | | 3/2012 | Roman |

FOREIGN PATENT DOCUMENTS

| | | |
|---|---|---|
| GB | 277636 A | 3/1928 |
| JP | 03-281987 | 12/1991 |
| JP | 05-227702 | 9/1993 |
| TW | 200905074 A | 2/2009 |
| WO | 20100135419 | 11/2010 |

OTHER PUBLICATIONS

International Search Report and Written Opinion, mailed Nov. 20, 2012.

European Patent Office, Extended European Search Report, Nov. 20, 2014, 6 pages.

* cited by examiner

METHOD TO PREVENT DEBRIS BUILD-UP ON RECIPROCATING AIR MOTOR PILOT VALVES

BACKGROUND

The present invention is directed generally to reciprocating piston pumps and more particularly to pilot valves used in reciprocating air motors used to drive reciprocating piston pumps.

Reciprocating piston pumps typically include an air-driven motor that converts a steady flow of compressed air into linear reciprocation of an air motor rod using an appropriate reversing valve and a pair of pilot valves, as is known in the art. The air motor rod is then used to drive a linearly reciprocating pump piston that can be configured to pump in both directions using appropriate check valves. These types of linearly reciprocating double-acting piston pumps are commonly used in lubrication dispensing systems to deliver highly viscous lubricants, such as oil or grease.

The reversing valve itself reciprocates to alternatively direct compressed air from a source to opposite sides of an air piston within the air motor to produce the reciprocating action of the pump piston. Reciprocation of the reversing valve is controlled by two pilot valves that engage the air piston at changeover positions to pneumatically change the position of the reversing valve. Engagement of the air piston with one of the pilot valves causes compressed air from the source to be directed to the opposite side of the reversing valve. For example, operation of such a valve combination is described in U.S. Pat. No. 3,943,823 to Tammy.

Compressed air provided to the air motor can include small dust and dirt particles, despite efforts to prevent entry of these particles into the air motor. Prolonged exposure to dust and dirt can degrade performance of moving parts and ultimately lead to failure. Pilot valves include a valve stem that can be subject to cyclic operation upwards of hundreds of actuations per minute. Dust and dirt can cause the valve stems and seals placed around them to prematurely wear out. Replacement of the pilot valves is costly and inconvenient to operators of the air motor. There is, therefore, a continuing need to improve the wear life of moving parts in air motors.

SUMMARY

The present invention is directed to an end cap assembly for a reciprocating air motor. The end cap assembly comprises a pilot valve and an end cap body. The pilot has a valve stem. The end cap body comprises a central bore for receiving an air motor rod, a valve bore in which the pilot valve is disposed such that the valve stem extends through the end cap body, and an air port extending through the end cap body. The air port has a contour to direct air toward the valve stem.

DETAILED DESCRIPTION

Figure 1:
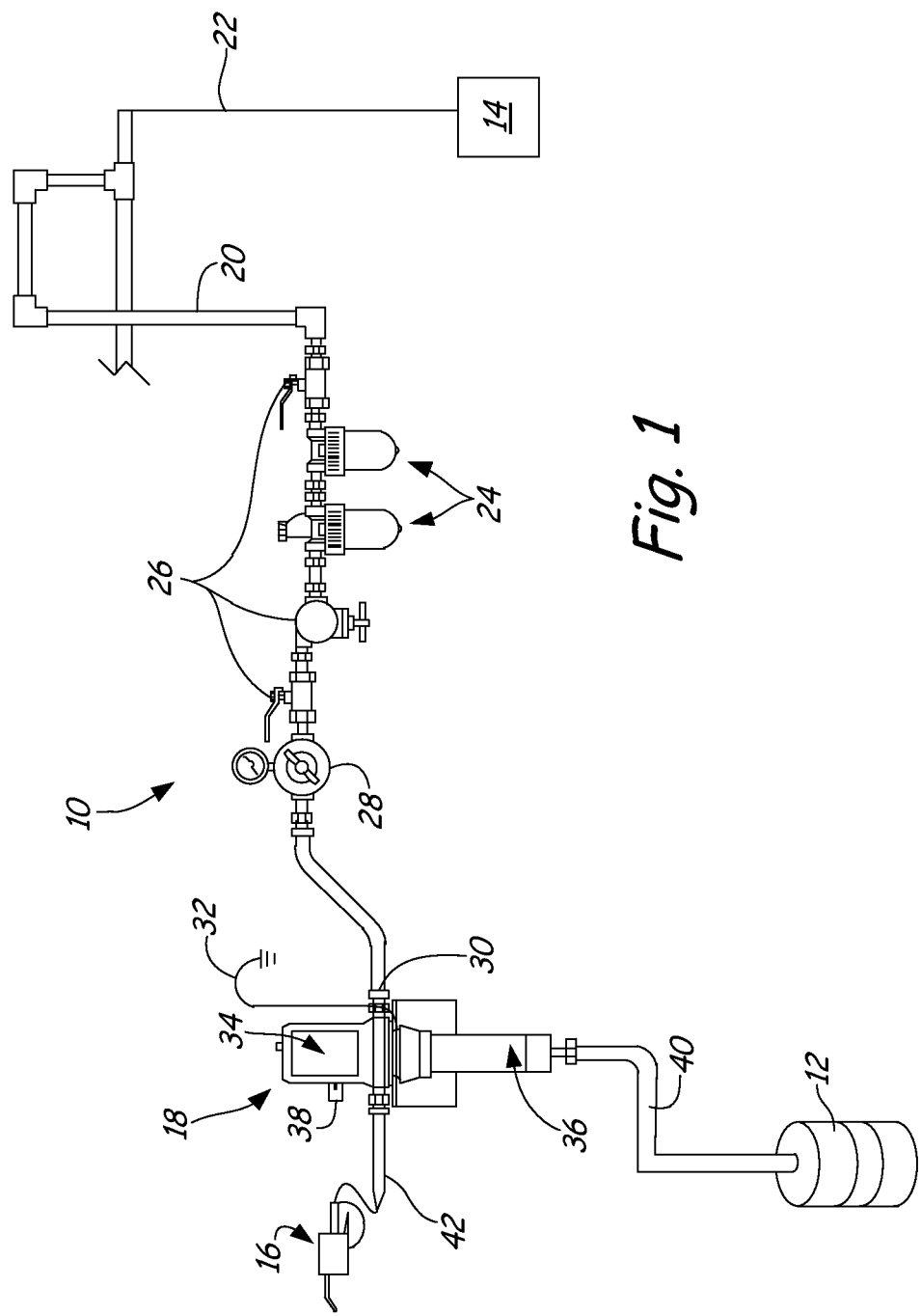
FIG. 1 is a schematic of a lubricant dispensing system comprising a fluid container, an air source and a linear displacement pump having an air motor with a pilot valve blow-off system of the present invention.

FIG. 1 is a schematic of lubricant dispensing system 10 comprising fluid container 12, air source 14, dispenser 16 and linear displacement pump 18, which has a pilot valve blow-off system of the present invention. Lubricant dispensing system 10 is provided with pressurized air from air source 14 through air distribution line 20. Air distribution line 20 is spliced into air source line 22, which is directly coupled to air source 14. In one embodiment, air source 14 comprises a compressor. Air source line 22 can be coupled to multiple air distribution lines for powering multiple dispensers. Air distribution line 20 includes other components such as filters 24, valves 26 and air regulator 28. Air motor assembly 34 is fed pressurized air from air distribution line 20 at air inlet 30. Pump 18 is connected to ground 32. The pressurized air drives air motor assembly 34 within pump 18, which drives a piston within pump assembly 36. After driving air motor assembly 34, the compressed air leaves pump 18 at air exhaust port 38.

Operation of the piston within pump assembly 36 draws lubricant, such as oil or grease, from container 12 through fluid line 40. Pump 18 pressurizes the lubricant and pushes it into discharge line 42, which is coupled to dispenser 16. Dispenser 16 includes a manually operated valve that, when actuated by an operator, dispenses the lubricant. Pump 18 operates at very high speeds, typically on the order of many hundreds of cycles per minute, in order to achieve the desired pressures in the pumped fluid. Such speeds require the introduction of a very high pressure flow of compressed air into air motor assembly 34. Despite the presence of filters 24, foreign bodies, such as dust, dirt and water particles, can enter air motor assembly 34 through line 22. These contaminants can potentially accelerate the degradation of moving components such as valves used in air motor assembly 34. In the present invention, a blow-off system is provided within air motor assembly 34 to use compressed air travelling through the air motor to clean off moving valve parts of air motor assembly 34.

Figure 2:
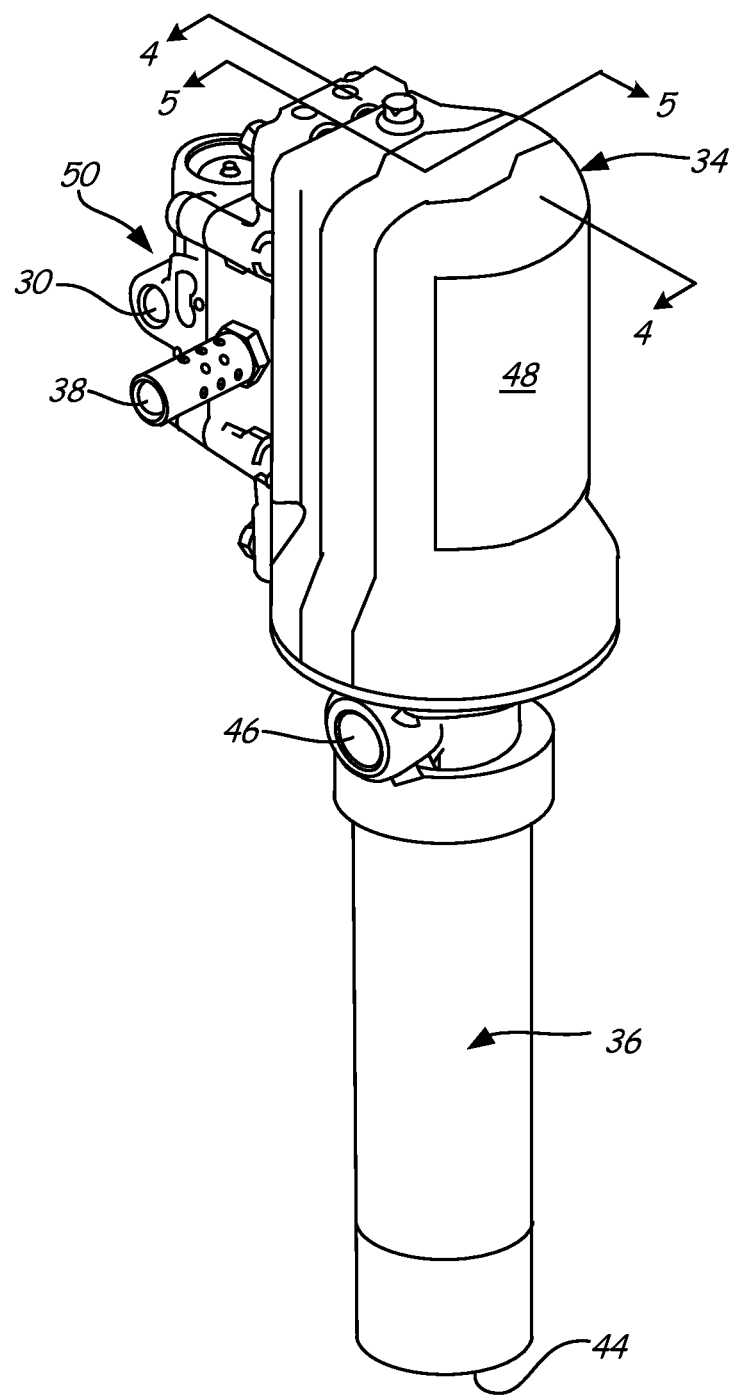
FIG. 2 is a perspective view of the linear displacement pump of FIG. 1 showing a pump assembly coupled to an air motor assembly.

FIG. 2 is a perspective view of linear displacement pump 18 of FIG. 1 showing pump assembly 36 coupled to air motor assembly 34. Pump 18 also includes air inlet 30, fluid inlet 44, fluid outlet 46, air motor cylinder 48 and reversing air valve kit 50. As discussed above, compressed air is provided to inlet 30 to drive the air motor within cylinder 48. Spent air is discharged from pump 18 at air exhaust port 38. Reversing air valve kit 50 includes a reversing valve that, along with a pair of pilot valves, alternately provides compressed air to opposite sides of an air piston within cylinder 48, as is know in the art. A fluid, such as oil or grease, is drawn into the bottom of pump cylinder 36 at fluid inlet 44, and discharged at fluid outlet 46. In the blow-off system of the present invention, the flow of compressed air routed from the reversing valve of valve kit 50 into cylinder 48 is directed across a valve stem of one of the pilot valves as the compressed air enters air motor cylinder 48.

Figure 3:
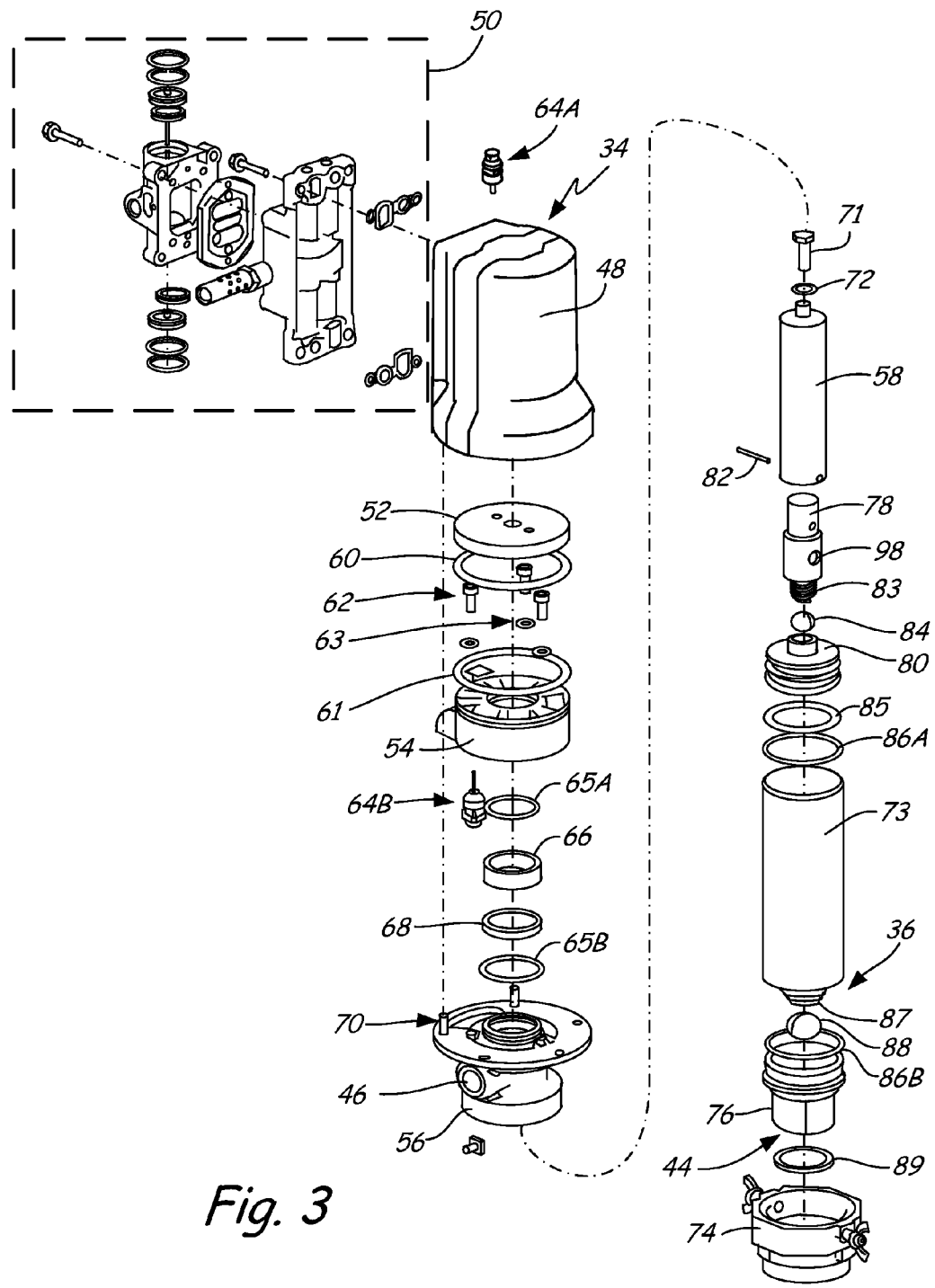
FIG. 3 is an exploded view of the linear displacement pump of FIG. 2 showing connection of the air motor assembly, the pump assembly and a valve kit.

FIG. 3 is an exploded view of linear displacement pump 18 of FIG. 2 showing connection of air motor assembly 34, pump assembly 36 and valve kit 50. Air motor assembly 34 includes cylinder 48, air piston 52, bottom cover 54, outlet housing 56 and displacement rod 58. Air motor assembly 34 further comprises air piston seal 60, cover seal 61, fasteners 62, fastener seals 63, pilot valves 64A and 64B, red seal 65A, outlet housing seal 65B, bearing 66, u-cup seal 68, cover fasteners 70, rod fastener 71 and rod washer 72. Pump assembly 36 includes cylinder 73, adapter 74, inlet valve housing 76, piston holder 78 and pump piston 80. Pump assembly 36 further comprises spring pin 82, first spring 83, first ball 84, piston seal 85, cylinder seals 86A and 86B, second spring 87, second ball 88 and strainer 89. Ball 84 and spring 83 form check valve 92, while ball 88 and spring 87 form check valve 96. Valve kit 50 includes reversing valve 100 and air manifold 102. Bottom cover, or end cap, 54 includes the blow-off system of the present invention to route air from reversing valve 100 and air manifold 102 across the valve stem of pilot valve 64B within cylinder 48. FIG. 3 will be discussed in greater detail concurrently with FIG. 4.

Figure 4:
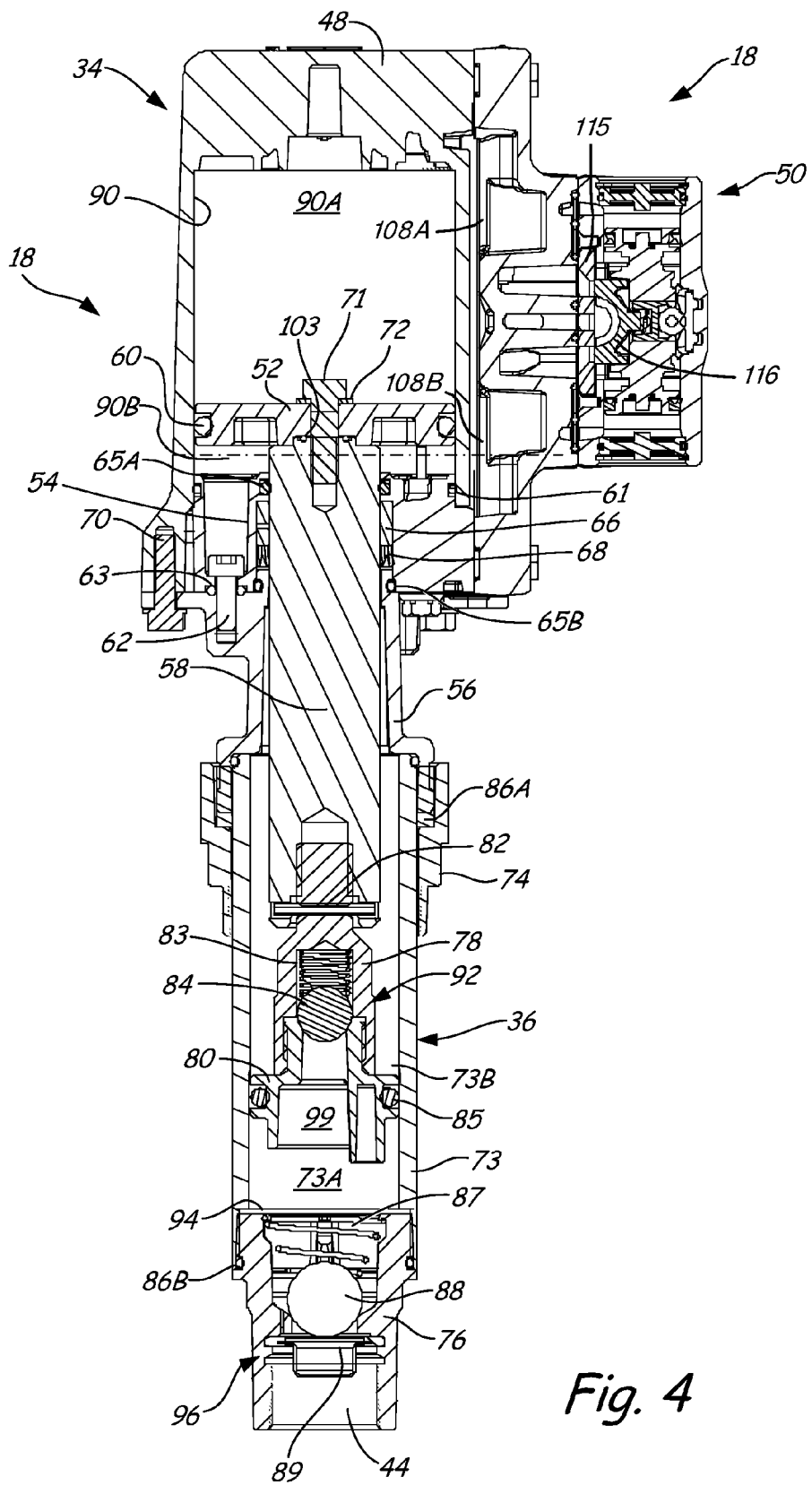
FIG. 4 is a cross-section of the linear displacement pump of FIG. 2 showing an air motor piston coupled to a pump piston using an air motor rod and a piston holder.

FIG. 4 is a cross-section of linear displacement pump 18 of FIG. 2 showing air motor piston 52 coupled to pump piston 80 using air motor rod 58 and pump holder 78. Pump 18 includes air motor assembly 34, pump assembly 36 and valve kit 50, which each include the components listed with reference to FIG. 3. Reversing valve 100 includes valve plate 115 and sliding cup 116. Air motor piston 52 is connected to rod 58 using fastener 71 and washer 72. Seal 103 prevents air from passing between piston 52 and displacement rod 58. Piston 52 resides within cylinder wall 90 inside air motor cylinder 48. Piston 52 rides against cylinder wall 90 with seal 60 being trapped between piston 52 and cylinder wall 90. Valve manifold 102 and reversing valve 100 of valve kit 50 are fluidly coupled to opposite sides 90A and 90B of cylinder on either side of piston 52. Outlet housing 56 is coupled to cylinder 48 via a plurality of fasteners 70. Bottom cover 54 is coupled to outlet housing 56 via a plurality of fasteners 62. Rod 58 extends through bottom cover 54 and outlet housing 56. Piston cylinder 73 is coupled to outlet housing 56 via adapter 74. Piston holder 78 is coupled to rod 58 via threaded connection and pin 82 within piston cylinder 73. Pump piston 80 is joined to piston holder 78 via any suitable mechanical coupling such as by a threaded engagement. Pump piston resides within cylinder 73. Pump piston 80 rides against pump cylinder 73 with seal 85 being trapped between piston 80 and cylinder 73.

First ball 84 and first spring 83 are disposed between piston 80 and piston holder 78. First spring 83 biases first ball 84 against a ball seat in piston 80 to form first check valve, or outlet valve, 92. Inlet valve housing 76 is joined to piston cylinder 73 via any suitable mechanical coupling such as by a threaded engagement. Second ball 88 and second spring 87 are disposed within valve housing 76 and retained by flange 94. Second spring 87 biases second ball 88 against a ball seat in valve housing 76 to form second check valve, or inlet valve, 96. Strainer 89 is force fit or snap fit into valve housing 76 to between ball 88 and inlet 44.

Valve kit 50 includes reversing valve 100 that, through manifold 102, alternatively provides air to opposite sides 90A and 90B of cylinder wall 90 on either side of piston 52. Rod 58 is thereby driven to reciprocate linearly within bearing 66 inside bottom cover 54. Seal 60 prevents air from passing around piston 52. Piston 52 is driven by rod 58 to reciprocate linearly within cylinder wall 90. The reversing valve of valve kit 50 is controlled by impact of piston 52 with pilot valves 64A and 64B (FIG. 3), as is known in the art. Seals 65B seals between bottom cover 54 and outlet housing 56, while seal 65A seals around displacement rod 58. Seal 65A prevents air from cylinder wall 90 from entering bottom cover 54, and seal 65B prevents air from entering outlet housing 56. Bearing 66 facilitates smooth translation of rod 58 and u-cup seal 68 prevents fluid from within piston cylinder 73 from entering air cylinder wall 90. Rod 58 drives piston holder 78 and pump piston 80 to pump fluid from inlet 44 to fluid outlet 46.

Pump assembly 36 is a double-acting pump such that, in conjunction with check valves 92 and 96, fluid is pumped out of outlet 46 on both an up-stroke and a down-stroke of piston 80. As rod 58 travels upward (with reference to the orientation of FIG. 4) on an up-stroke, piston holder 78 and pump piston 80 are drawn upward through engagement with spring pin 82. Upward movement of pump piston 80 produces a vacuum within chamber 73A of pump cylinder 73 that causes second check valve 96 to open and fluid from inlet 44 and container 12 (FIG. 1) to be draws into cylinder 73. Specifically, ball 88 is drawn away from its ball seat in valve housing 76 by the vacuum, overcoming the force of spring 87. The vacuum produced in chamber 73A also helps maintain ball 84 against its ball seat in piston 80, which augments the force of spring 83. Any fluid already present within chamber 73B of cylinder 73 is prevented from traveling upstream from chamber 73B back to chamber 73A via first check valve 92. Specifically, fluid within chamber 73B is prevented from traveling backwards through holes 98 (FIG. 3) in holder 78 via ball 84 of first check valve 92. Piston 80 pushes fluid present in chamber 73B into outlet housing 56 where the fluid is forced through outlet 46 (FIG. 3). On a down-stroke, piston 80 pushes fluid within chamber 73A into opening 99 within piston 80. The fluid is pushed through first check valve 92 as the pressure from the fluid in chamber 73A pushes ball 84 away from its ball seat in piston 80. After passing through opening 99 and entering piston holder 98, the fluid travels into chamber 73B through holes 98 (FIG. 3). Simultaneously, fluid within chamber 73B is pushed out of outlet 46 (FIG. 3). Piston 80 thereby can continue to reciprocate within cylinder 73, pumping fluid on both up-strokes and down-strokes.

Operation of air motor assembly 34 includes reciprocation of a plurality of parts, including piston 52, a piston within reversing valve 100, and pilot valves 46A and 46B. It is not uncommon for debris to be ingested into cylinder wall 90 within air motor cylinder 48 and air manifold 102 within valve kit 50. In particular, debris is passed through passages 108A and 108B from manifold 102. Once the debris has entered cylinder wall 90, it tends to collect atop bottom cover 54, where it can continuously be ingested and expelled from pilot valve 64B, causing wear on seals therein. As such, the present invention incorporates a valve stem blow-off system that is directed toward the valve stem of pilot valve 64B to keep moisture, debris, dust and dirt from accumulating at pilot valve 64B.

Figure 5:
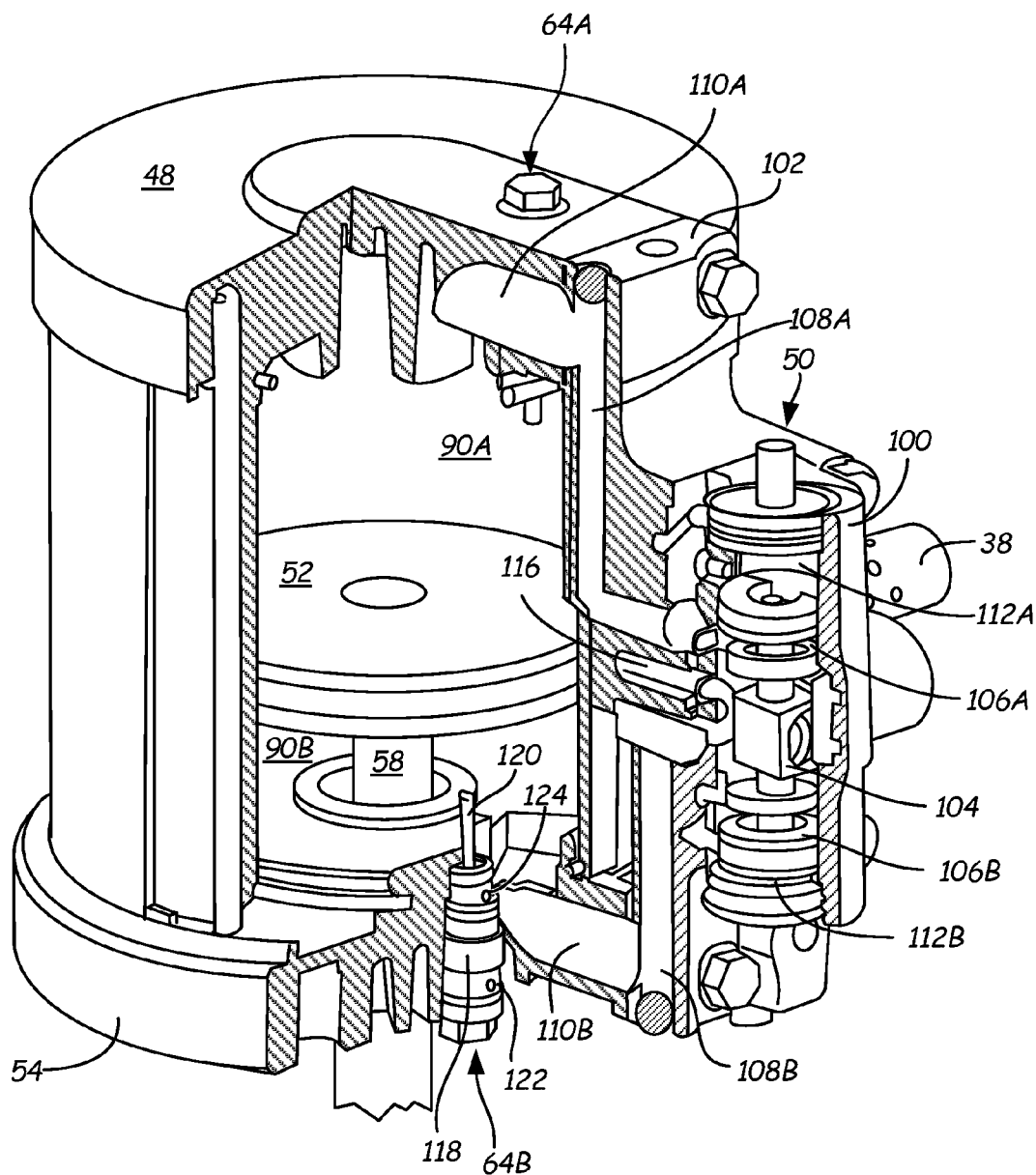
FIG. 5 is a partial cross-section of another embodiment of an air motor assembly and a valve kit showing assembly of a reversing valve and pilot valves within a bottom cap of the air motor assembly.

FIG. 5 is a partial cross section of another embodiment of air motor assembly 34 and valve kit 50, similar to that of FIG. 2, showing assembly of reversing valve 100 and pilot valves 64A and 64B within bottom cover 54 of air motor assembly 34. Air motor assembly 34 includes cylinder 48, piston 52, bottom cover 54 and rod 58. Valve kit 50 includes air manifold 102, and reversing valve 100, which includes reversing valve piston 104. Piston 104 drives cup 116 (which has been omitted from FIG. 5 for clarity).

Pressurized air is provided to cavities 106A and 106B of piston 104 from pressurized air source 14 (FIG. 1). Cavities 106A and 106B are fluidly coupled so as to form a common cavity. Depending on the position of piston 104, cavity 106A connects to passage 108A in manifold 102, while cavity 106B connects to passage 108B in manifold 102 through cup 116 (the location of which is representatively shown with an arrow in FIG. 5). Sliding cup 116 alternately connects passage 108A and 108B to air source 14 (FIG. 1). Passage 108A includes port 110A, which penetrates through cylinder 48 to fluidly connect to chamber 90A. Passage 108B includes port 110B, which penetrates through bottom cover 54 to fluidly connect to chamber 90B. Separately, compressed air is provided to cavities 112A and 112B of piston 104 from pressurized air source 14 through bleed holes 123A and 123B. Engagement of piston 52 with each of pilot valves 64A and 64B exhausts air pressure to the opposite cavity 112B and 112A, respectively, thereby inducing piston 104 to move towards the exhausted cavity and away from the activated pilot valve. This permits piston cavities 106A and 106B to alternately deliver compressed air to chambers 90A and 90B. Sliding cup 116 alternatively connects to chambers 90A and 90B to expel air from air motor assembly 34 at air exhaust port 38.

Pilot valve 64B includes valve body 118 and valve stem 120. Valve body 118 includes inlet holes 122 and outlet holes 124. Pressurized air from manifold 102 is directed into pilot valve 64A at inlet 122, forcing valve stem 120 from valve body 118, en route to chamber 112A on the opposite side of piston 104. When piston 52 depresses valve stem 120, pressurized air in chamber 112A is released to atmosphere through outlet bore 124. Simultaneously, bleed hole 123B provides pressurized air to chamber 112B of piston 104, thereby causing piston 104 to be pushed upward (toward pilot valve 64A with reference to FIG. 5) connecting cavity 106A to passage 108B and pressurizing chamber 90B to force air piston 52 upward (toward pilot valve 64A with reference to FIG. 5). Pilot valves 64A and 64B bleed pressurized air at a significantly higher rate than pressure is fed through bleed ports 123A and 123B. Operation of such a reversing valve and pilot valve circuit is further described in U.S. Pat. Pub. No. 2012/0060941 to Roman, which is assigned to Graco Minnesota Inc. and incorporated herein by this reference.

In the present invention, port 110B is contoured (not shown in FIG. 5) to direct blow-off air across pilot valve 64B. The blow-off air prevents build-up of debris, dirt and moisture on valve stem 120. This increases the life of seals used in pilot valve 64B. Although described with respect to pilot valve 64B because the majority of debris and dirt accumulates at the bottom pilot valve in bottom cover 54, the invention can be applied to either pilot valve 64B or pilot valve 64A, or both.

Figure 6:
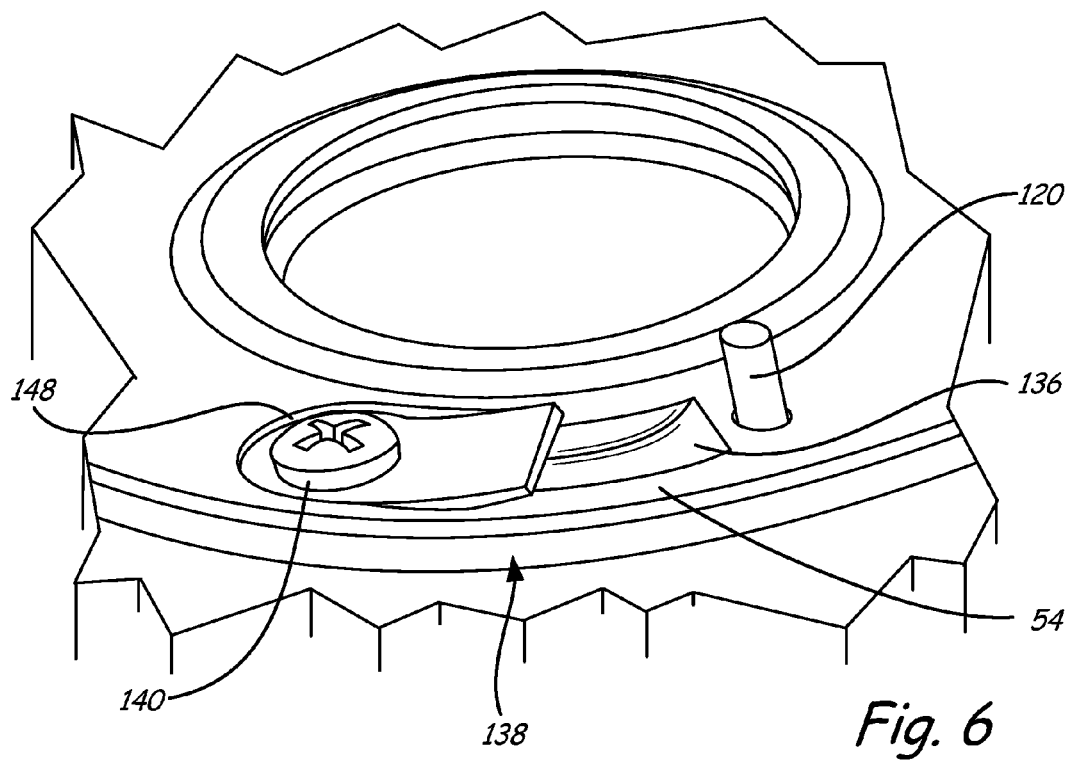
FIG. 6 is a top view of one embodiment of a bottom cap and pilot valve assembly in which a blow-off system of the present invention is installed.
Figure 7:
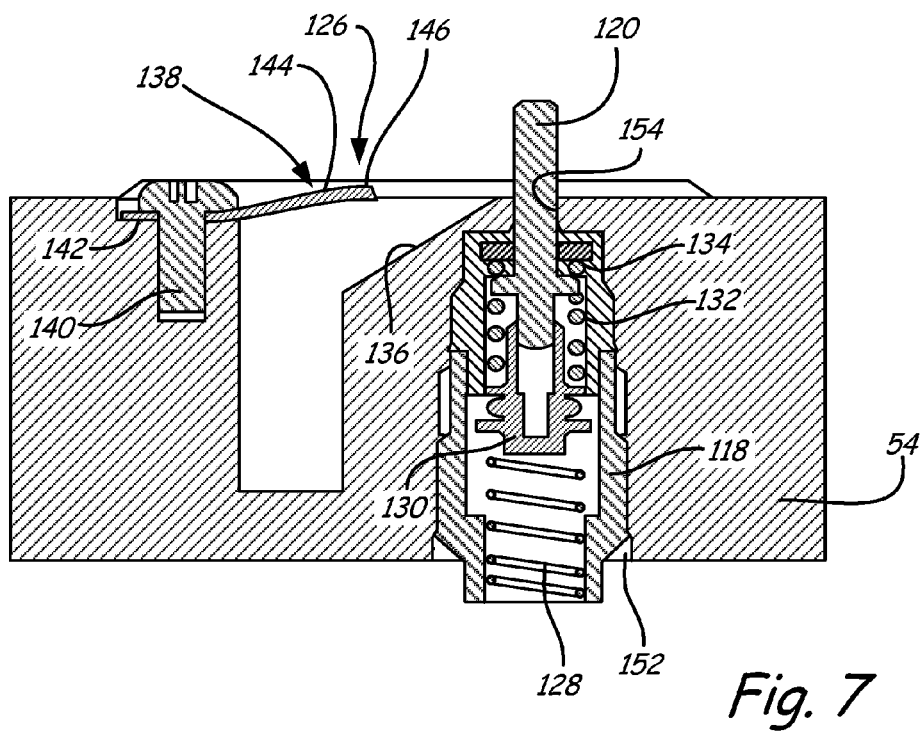
FIG. 7 is a cross-sectional view of the bottom cap and pilot valve assembly of FIG. 6 showing assembly of the pilot valve and configuration of the blow-off system.

FIG. 6 is a top view of one embodiment of the assembly of bottom cover 54 and pilot valve 64B in which blow-off system 126 of the present invention is installed. FIG. 7 is a cross-sectional view of bottom cover 54 and pilot valve 64B of FIG. 6 showing assembly of pilot valve 64B and configuration of blow-off system 126. Pilot valve 64B includes valve body 118, valve stem 120, valve spring 128, poppet 130, energy absorbing spring 132 and valve seal 134. Blow-off system 126 comprises contour 136, deflector 138 and fastener 140. Deflector 138 comprises fastener portion 142, angled portion 144 and straight portion 146. Bottom cover 54 includes counterbore 148, rod bore 150 and valve bore 152, which includes stem bore 154. FIGS. 6 and 7 will be discussed concurrently.

Pilot valve 64B operates as is described in the Detailed Description and Background of the aforementioned patent publication to Roman. For example, piston 52 of air motor assembly 34 depresses valve stem 120 to move poppet 130 into position to cover outlet bore 124. Energy absorbing spring 132 biases valve stem 120 away from poppet 130, while valve spring 128 biases poppet 130 toward bore 154.

Pressurized air flows radially outward through port 110B to enter cylinder wall 90 (FIG. 4) during operation of air motor assembly 34. Ordinarily, in prior art air motors, the compressed air would travel straight into the air motor cylinder without directly engaging a pilot valve. In the present invention, port 110B includes blow-off system 126 to direct the compressed air into direct engagement with pilot valve 64B. Specifically, port 110B includes contour 136 to direct the compressed air at valve stem 120. In the embodiment shown, contour 136 comprises a flat surface extending at an angle from port 110B to valve stem 120. More particularly, contour 136 extends at an obtuse angle with respect to the axis of the portion of valve stem 120 penetrating into cylinder 48. Contour 136 extends toward the base of valve stem 120 to direct air close to the area of interaction between valve stem 120 and stem bore 154. Contour 136 may include rounded edges at port 110B and the surface of bottom cover 54. In other embodiments, contour 136 may be curved, arcuate, corrugated or undulating.

Blow-off system 126 further comprises deflector 138 that pushes compressed air leaving port 110B across contour 136. Together deflector 138 and contour 136 funnel or aim the compressed air toward valve stem 120. In the embodiment shown, deflector 138 comprises a sheet metal strip that is fastened to bottom cover 54 at fastener portion 142. Fastener 140 extends through fastener portion 142 and threads into a mating bore, which includes counterbore 148 so as to recess deflector 138 into bottom cover 54. Angled portion 144 extends out over contour 136 to form a flow path that, in the embodiment shown, converges towards valve stem 120. Straight portion 146 extends from angled portion 144 directly towards valve stem 120 to impart a velocity gradient into the compressed air that is tangent to valve stem 120.

The flow path between contour 136 and deflector 138 need not converge and may have a generally uniform cross-sectional area. In yet other embodiments, contour 136 and deflector 138 may form a converging-diverging nozzle to accelerate the compressed air toward valve stem 120. In other embodiments, deflector 138 can be comprised of other materials than metal, such as plastic. In other embodiments, deflector 138 may be completely flat or curved, rather than having the three flat and angled components shown. In the embodiment shown, contour 136 extends with a circumferential component so as to trace the circular shape of bottom cover 54 circumscribing bore 150. However, in other embodiments, for ease of manufacture, contour 136 may extend straight toward stem bore 154 rather than have a circumferential component.

In an alternative embodiment of the invention, contour 136 may be positioned in a surface of piston 52 facing toward pilot valve 64B, rather than in bottom cover 54. For example, contour 136 may comprise an arcuate indentation such that air radially flowing from port 110B flows into contour 136 in piston 52 and is redirected one-hundred-eighty degrees back toward pilot valve 64B. In other words, contour 136 in piston 52 guides the air from port 110B a small lateral distance equal to the distance between port 110B and pilot valve 64B while simultaneously reversing the axial direction of flow. Thus, when piston 52 reaches a change-over position to engage pilot valve 64B, a burst of air is delivered to the valve when piston 52 is in the vicinity of the valve.

The blow-off system of the present invention provides an inexpensive, integral method for preventing and inhibiting dirt, debris and moisture from accumulating on valve stem 120 and bottom cover 54. This prevents the contaminants from being pulled through stem bore 154 and thereafter being ground against valve seal 134. Thus, the wear life of valve seal 134 is increased, which decreases cost associated with replacing valve seal 134 and lost productivity time. The blow-off system requires no additional components and is pre-installed, requiring no action to be taken by an operator of pump 18.

Although the present invention has been described with reference to preferred embodiments, workers skilled in the art will recognize that changes may be made in form and detail without departing from the spirit and scope of the invention.

The invention claimed is:

1. An end cap assembly for a reciprocating air motor, the end cap assembly comprising:
    a pilot valve having a valve stem;
    an end cap body comprising:
        a central bore for receiving an air motor rod;
        a valve bore in which the pilot valve is disposed such that the valve stem extends through the end cap body; and
        an air port extending through the end cap body, the air port having a contour to direct air toward the valve stem; and
        a flow deflector coupled to the end cap body to overhang the air port and direct air from the contour toward the valve stem, wherein the flow deflector is disposed in a counterbore in the end cap body so as to be inlaid in the contour.

2. The end cap assembly of claim 1 wherein the contour comprises an angled surface extending between the air port and the valve stem.

3. The end cap assembly of claim 2 wherein the contour extends from the air port toward a portion of the valve stem extending from the end cap body to form an obtuse angle with the valve stem.

4. The end cap assembly of claim 2 wherein the contour is flat.

5. The end cap assembly of claim 1 wherein the flow deflector is shaped to reorient airflow from the air port toward the valve stem.

6. The end cap assembly of claim 1 wherein the flow deflector comprises:
    a sheet metal strip fastened to the counterbore.

7. The end cap assembly of claim 1 wherein the deflector includes:
    a first portion extending at an angle toward the valve stem; and
    a second portion extending from the first portion parallel to the end cap body.

8. The end cap assembly of claim 1 wherein the pilot valve comprises:
    a valve body having an internal bore from which the valve stem extends;
    an air passage intersected by the valve stem in the internal bore; and
    an energy absorbing valve spring biasing the valve stem out of the internal bore.

9. The end cap assembly of claim 8 wherein the pilot valve further comprises:
    a poppet disposed within the valve body to engage the valve stem; and
    an energy absorbing valve spring disposed between the valve stem and biasing the poppet towards a stem bore.

10. The end cap assembly of claim 1 and further comprising:
    an air motor housing coupled to the end cap to define a cylinder;
    an air motor rod extending into the cylinder through the central bore of the end cap body;
    an air motor piston coupled to the air motor rod in the cylinder.

11. A reciprocating air motor comprising:
    an air piston;
    a drive rod extending from the piston;
    an air motor housing defining a cylinder wall, the air motor housing comprising:
        first and second end walls located at opposite ends of the cylinder wall;
        a central bore extending through the first end wall and that receives the drive rod;
        first and second air passages extending through the first and second end walls, respectively;
        first and second valve bores extending into the first and second end walls, respectively;
    a reversing valve for alternatively providing compressed air to the first and second air passages; and
    first and second pilot valves disposed in the first and second valve bores, respectively; and
    a flow deflector coupled to the first end wall;
    wherein the first air passage includes contouring to direct airflow toward the first pilot valve; and
    wherein the flow deflector is disposed within a counterbore within the first end wall so as to be inlaid in the contouring to funnel airflow from the contouring to the first pilot valve.

12. The reciprocating air motor of claim 11 wherein the air motor housing comprises:
    an end cap comprising the first end wall; and
    an air motor cylinder comprising:
        a side wall having:
            a first end that receives the end cap; and
            a second end; and
        the second end wall attached to the second end.

13. The reciprocating air motor of claim 11 wherein the first pilot valve comprises:
    a valve body disposed in the first valve bore;
    a valve stem extending from the valve body;
    a poppet disposed within the valve body; and
    an valve energy absorbing spring disposed between the valve stem and the poppet, wherein the energy absorbing spring biases biasing the valve stem out of the valve body.

14. The reciprocating air motor of claim 11 wherein the contouring of the first air passage comprises:
    a flat surface extending from the first air passage to the pilot valve to form an obtuse angle with an axis of a portion of the valve stem of the first pilot valve extending into the cylinder wall.

15. A method of removing contaminants from a valve stem in a reciprocating air motor, the method comprising:

reciprocating a reversing valve to alternately deliver compressed air to opposite sides of an air motor piston through first and second ports extending through a piston cylinder;

activating the reversing valve using first and second pilot valves having first and second valve stems, respectively, that engage opposite sides of the air motor piston within the cylinder; and directing blow-off air from the first port across the first valve stem, comprising:

passing the blow-off air across a contour that guides air from the first port towards the first valve stem; and turning the blow-off air from the contour towards the first valve stem with a deflector overhanging the first port and disposed within a counterbore in a surface of the piston cylinder through which the first port extends so as to be inlaid in the contour.

16. The method of claim 15 wherein the contour comprises:

a flat, angled surface that extends from the first port toward the first valve stem.

17. The method of claim 15 wherein the deflector comprises:

a first portion angled across the contour; and a second portion extending from the first portion perpendicular to the first valve stem.

18. The method of claim 15 wherein the contour comprises:

a shaped surface of the air motor piston that receives air from the first port and turns the air toward the first valve stem.

* * * * *